United States Patent [19]
Breidenstein et al.

[11] Patent Number: 5,257,260
[45] Date of Patent: Oct. 26, 1993

[54] EXPANDING SWITCHING CAPABILITY OF A TIME DIVISION COMMUNICATION SYSTEM BY MULTIPLEXING GROUPS OF CIRCUITS INTO SUCCESSIONS

[75] Inventors: Charles J. Breidenstein, Rochester; Jerome S. Caplan, Henrietta; Klaus Gueldenpfennig, Penfield, all of N.Y.

[73] Assignee: Redcom Laboratories Inc., Victor, N.Y.

[21] Appl. No.: 809,662

[22] Filed: Dec. 18, 1991

[51] Int. Cl.⁵ ............................................... H04J 3/22
[52] U.S. Cl. ........................................ 370/84; 370/68
[58] Field of Search ............... 370/84, 58.1, 93, 109, 370/77, 68, 112

[56] References Cited

U.S. PATENT DOCUMENTS

| | | | |
|---|---|---|---|
| 3,761,894 | 9/1973 | Pile et al. | 370/68 |
| 4,228,536 | 10/1980 | Gueldenpfennig et al. | 370/66 |
| 4,298,977 | 11/1981 | Abbott et al. | 370/68 |
| 4,805,172 | 2/1989 | Barbe et al. | 370/68.1 |
| 5,157,656 | 10/1992 | Turudic et al. | 370/68 |

Primary Examiner—Douglas W. Olms
Assistant Examiner—Shick Hom
Attorney, Agent, or Firm—M. Lukacher

[57] ABSTRACT

A TDM (Time Division Multiplexed) telephony switching system which provides expanded switching capacity without change in the physical form factor of the system or of the design of the circuits which provide TDM multiplexed digital signals (the port and service circuits). Additional ports and service circuits are provided in the same number of time slots per frame as existed before system expansion thereby providing additional ports and/or service circuits which can be interconnected without significantly affecting the cost of the system. Expansion is achieved by multiplexing the digital signals and transmitting them at a higher rate on existing send highways of the system. The time slot interchange is expanded by providing a memory with additional locations for each group of additional circuits. The signals are demultiplexed and switched in the time slot interchange and transmitted on receive highways (additional receive highways being provided for the additional groups of circuits) at the rate at which the existing port and service circuits are designed to operate. The expanded system is, therefore, compatible since the highway signals as seen from the circuits being switched are unchanged. Also, the existing design of the shelves, and the back plane interconnecting board thereof, is compatible with the expanded system.

12 Claims, 7 Drawing Sheets

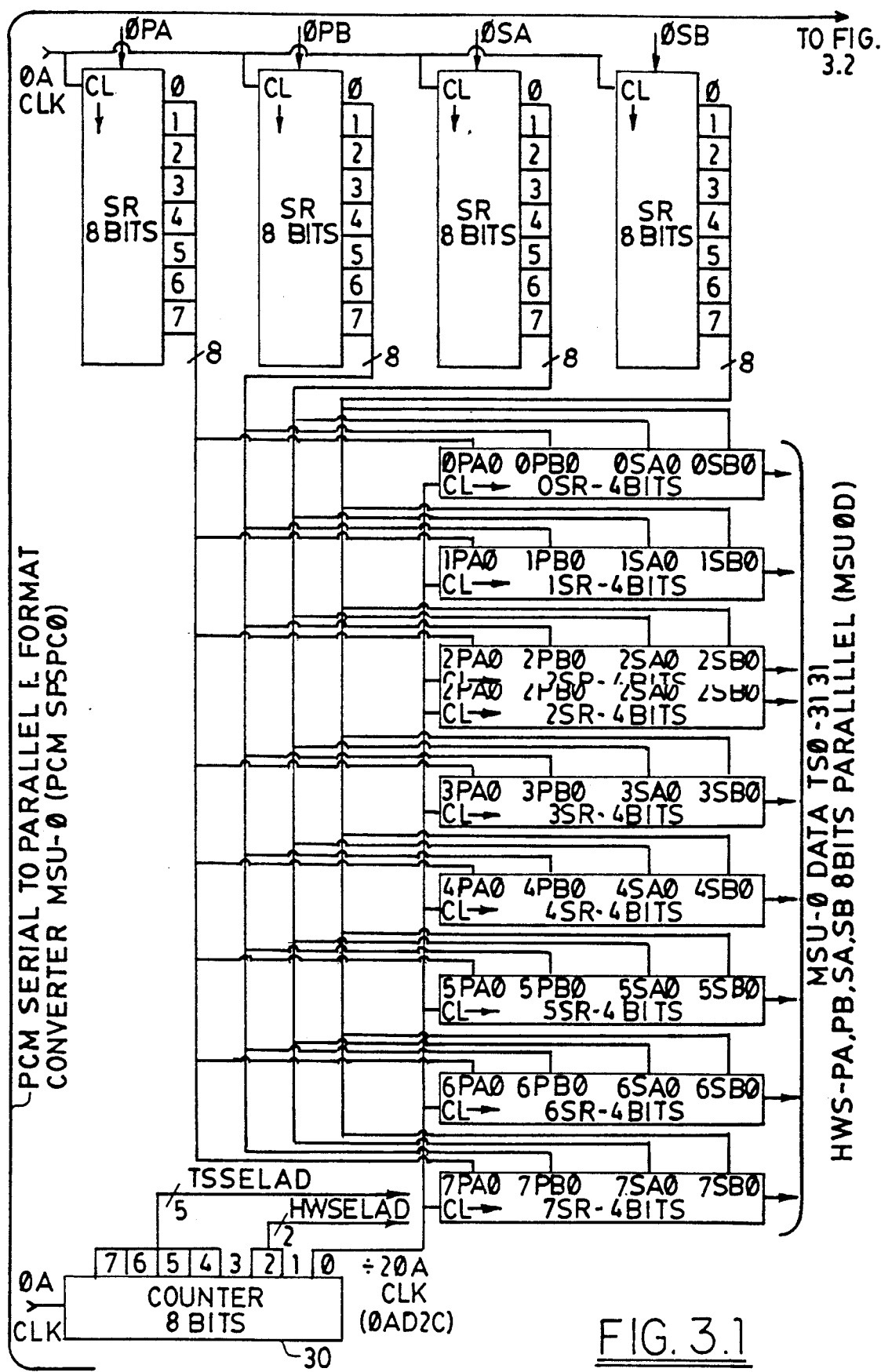
FIG. 3.1

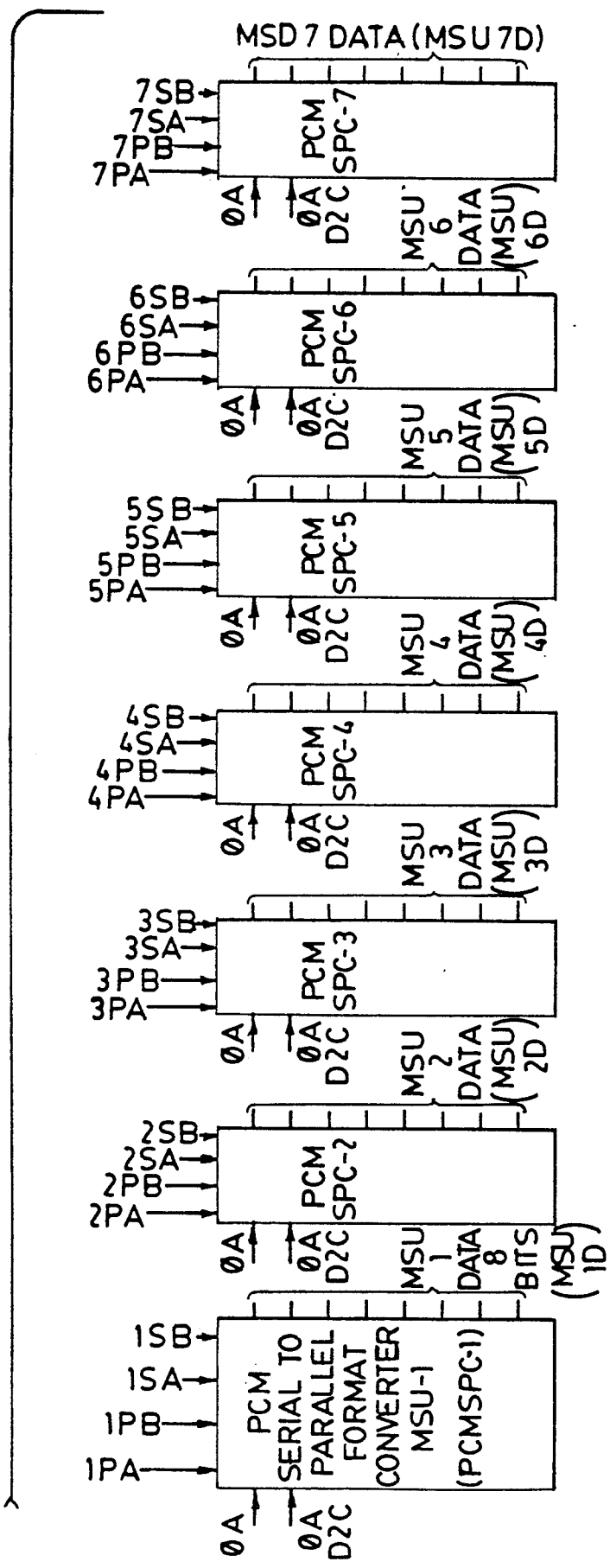
FIG. 3.2

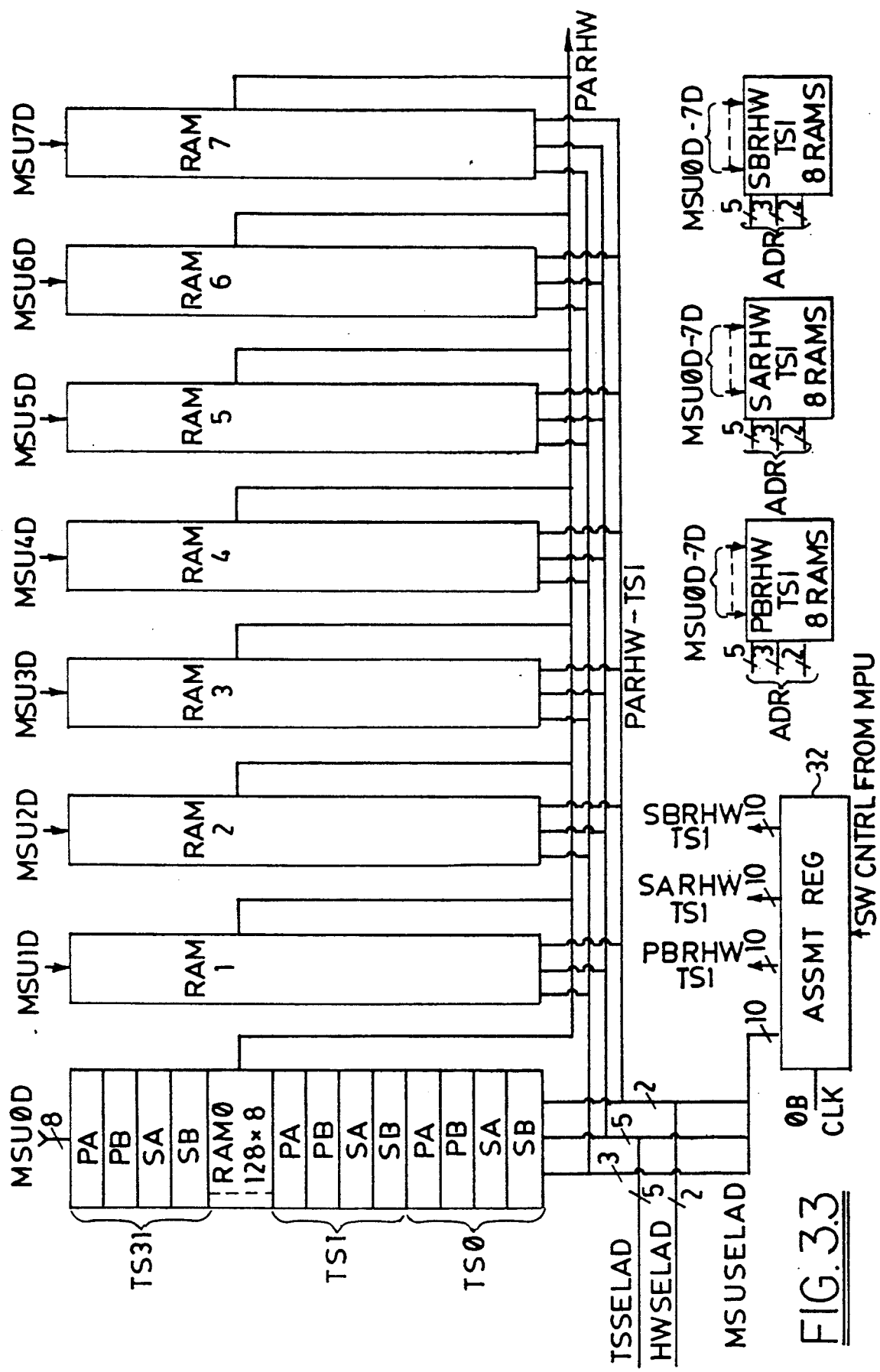
FIG. 3.3

EXPANDING SWITCHING CAPABILITY OF A TIME DIVISION COMMUNICATION SYSTEM BY MULTIPLEXING GROUPS OF CIRCUITS INTO SUCCESSIONS

DESCRIPTION

The present invention relates to time division multiplex (TDM) digital communication systems and particularly to a TDM switching system for providing communications between circuits additional to those which an existing system was capable of interconnecting (an expanded TDM system) which is compatible with such an existing system.

The present invention is especially suitable for expanding a modular TDM digital communication system of the type described in U.S. Pat. No. 4,228,536 issued Oct. 14, 1980 and which is sold by Redcom Laboratories, Inc. of Victor, New York U.S.A. Aspects of the invention will be applicable to other TDM communication systems where increased switching capacity, especially in a nonblocking mode is desired.

The TDM system described in the above referenced patent is capable of connecting 512 circuits. These circuits are arranged in modular switching units (MSU) having two groups of circuits, referred to in the patent as port and service circuits. Each group has the capacity of handling up to 32 circuits (for lines, trunks, multiplexers, tone generators, receivers, etc.). Eight such modular switching systems may be used. Inter-MSU highways carry repetitive frames of time slots between MSUs so as to enable 512 circuits to be interconnected by time slot interchanges in each MSU.

In U.S. Pat. No. 4,805,172, issued Feb. 14, 1989, a TDM digital communication system is described which is capable of interconnecting over 10,000 circuits. These circuits are sometimes referred to as lines. A large scale TDM switching system in accordance with the U.S. Pat. No. 4,805,172 is also available from Redcom Laboratories, Inc. Increased switching capacity is obtained by increasing the number of time slots per group of circuits and increasing the speed at which the digital signals are transmitted between domains of the system.

There exists a need for TDM digital communications, especially telephone communications which is capable of handling more circuits than the system of the U.S. Pat. No. 4,228,536. Utilizing a large scale switching system such as described in the U.S. Pat. No. 4,805,172, may not be a cost effective means of providing an expanded switching capacity. Increasing the capacity of an existing system of the type described in U.S. Pat. No. 4,228,536 by increasing the number of time slots per frame would require a complete redesign of the circuits (the port and service circuits) which would incur a significant cost discontinuity.

It is the principal feature of the present invention to enable an existing TDM switching system to be expanded in switching capacity so that it can switch signals from an expanded number of circuits (for example 512 circuits, as are handled with a system of the type of U.S. Pat. No. 4,228,536 to 1,024 circuits), in a manner which is compatible with an existing lower capacity system without a change in form factor of the system or change in the design of the circuits, principally the port and service circuits of the existing system. The physical design of TDM switching systems may be implemented by arranging the circuits which are connected to lines and to service facilities (e.g., tone receivers and senders, call progress tone detectors and special service features) on printed circuit boards or cards which are received in different adjacent slots on a shelf in a rack. Some of these lines may be associated with multiplexers, such as of the T1 type or other high density transmission systems which utilize a large number of time slots. For example, a T1 system utilizes 24 time slots. Thus, time slot exhaustion often occurs while a number of physical slots remain open and are available for additional circuits. It is a feature of this invention to enable such open physical slots to be used by additional circuits thereby making effective use of the shelf and providing greater flexibility in design of the communication system which utilizes the TDM switching system.

Accordingly, it is the principal object of this invention to provide an improved TDM communication system having expanded switching capability.

It is a further object of the present invention to provide a TDM digital communication system which achieves expanded capability in a manner compatible with an existing, nonexpanded system both by not needing changes in the form factor of the existing system and changes in the design of the circuits of the system which send and receive TDM digital signals in different time slots.

It is still another object of the present invention to provide expanded switching capacity in a time division multiplex digital communication system without changing the manner in which the time slots are transmitted and received, specifically by utilizing the same number of time slots in a frame as used in a pre-existing system thereby minimizing the cost of expansion of the system.

Briefly described, a TDM digital communication system embodying the invention capable of switching digital signals between N circuits which are assigned to different ones of N sequential time slots in repetitive frames each containing N time slots is expanded to enable switching of digital signals between n times N circuits in frames containing the same number N of time slots, all of which are in synchronous relationship, by multiplexing the signals from the circuits onto a send highway so that the signals from the n times N circuits occurs sequentially and at a rate which is n times faster than they occur from any one of the circuits. A time slot interchange has a memory within separate groups of locations for digital signals in each time slot of a frame from each of the circuits. This memory is addressed to read in the digital signals in the locations for a respective group of up to N circuits and read out the digital information to different ones of a plurality of receive highways connected to each group of circuits thereby establishing connections between selected circuits. The signals applied to the time slot interchange are demultiplexed to apply them from each of the circuits to the time slot interchange with the time slots in each frame from each group of circuits in synchronous relationship and at a rate which is 1/n times as fast as the rate at which the signals occur on the send highway. The switching system may contain modular switching units each of which has expanded capability. Then, the time slot interchanges have memory locations from the circuits of each of the switching units and are connected to each of their groups of circuits by separate receive highways. In this manner, nonblocking switching between all circuits in all switching units is achieved.

By increasing the rate at which the signals are transmitted on the send highways and increasing the number of memory locations in the time slot interchange (TSI), expanded switching capability is provided in a manner compatible with an existing system, since the signals are transmitted and received from the circuits which generate and utilize them in frames having the same number of time slots and at the same rate as in the existing system, and no additional interconnecting highways are needed due to the multiplexing.

The foregoing and other objects, features and advantages of the invention, as well as a presently preferred embodiment thereof, will become more apparent from the reading of the following description in connection with accompanying drawings in which.

Figure 1:
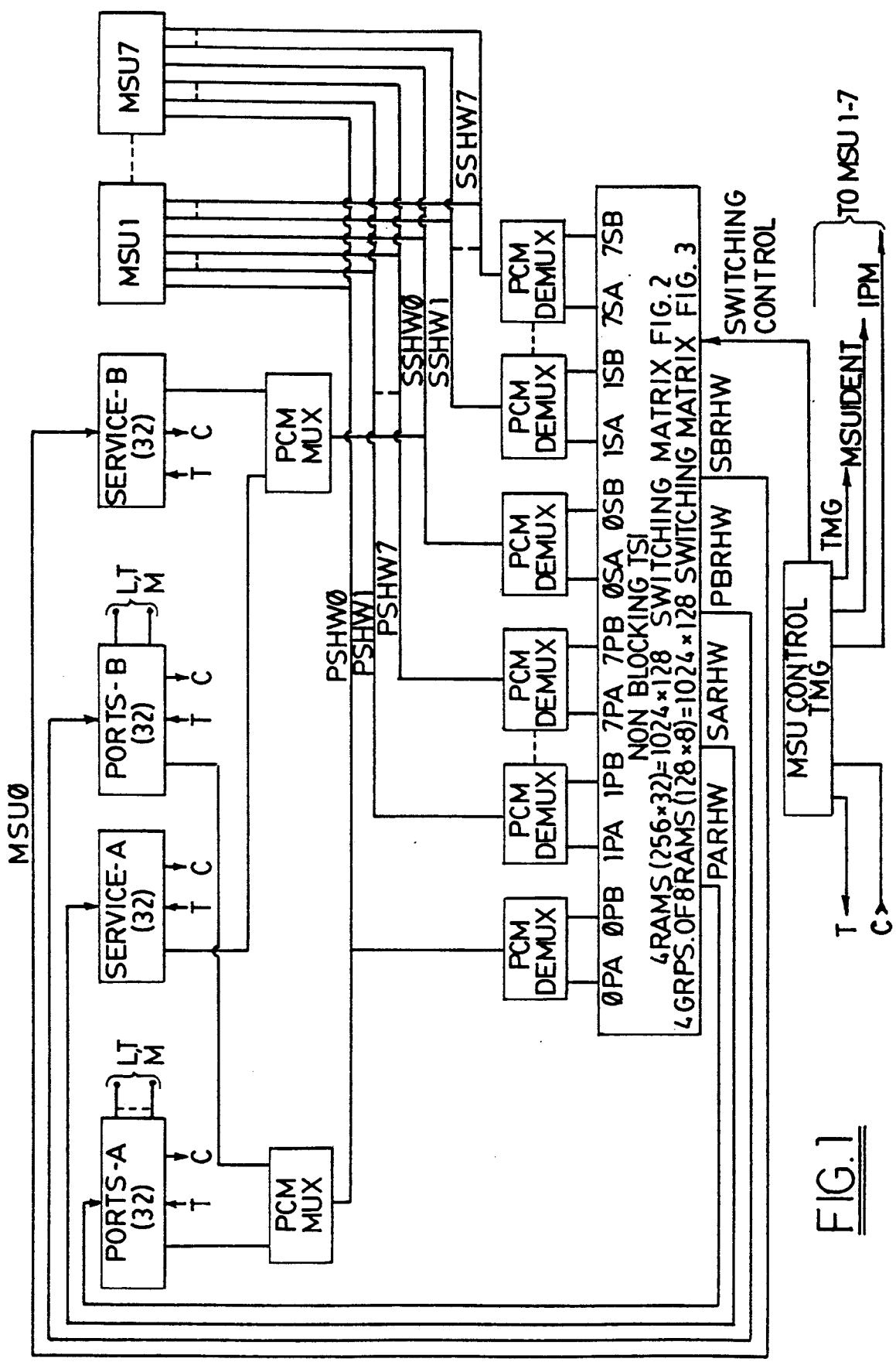
FIG. 1 is a block diagram of a TDM digital communication system embodying the invention.
Figure 4:
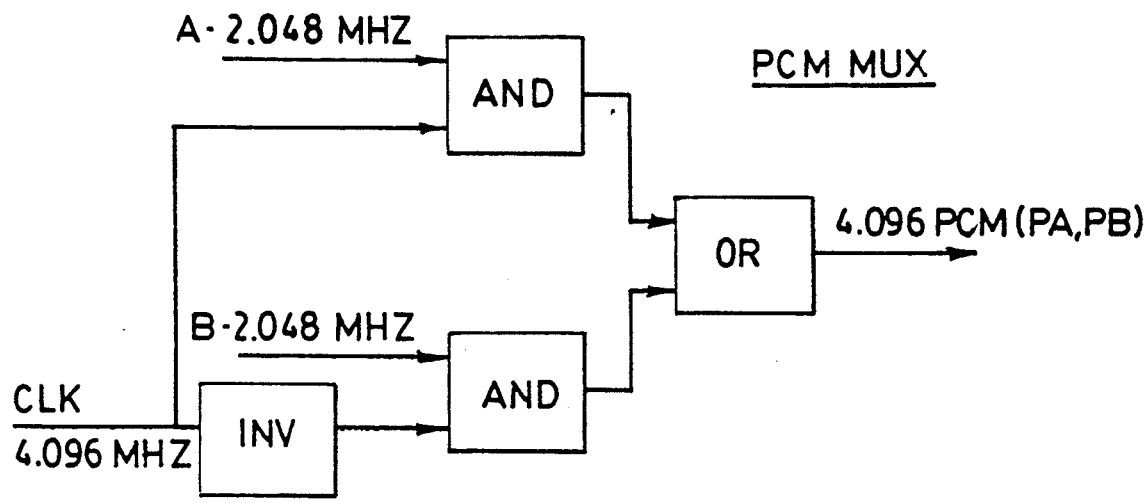
Figure 5:
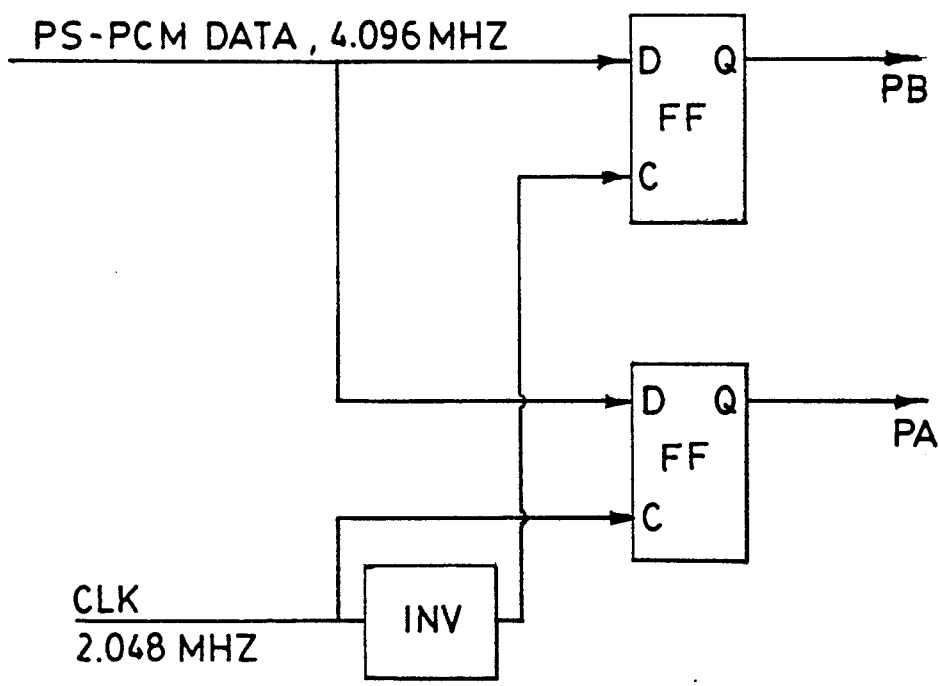
Figure 6:
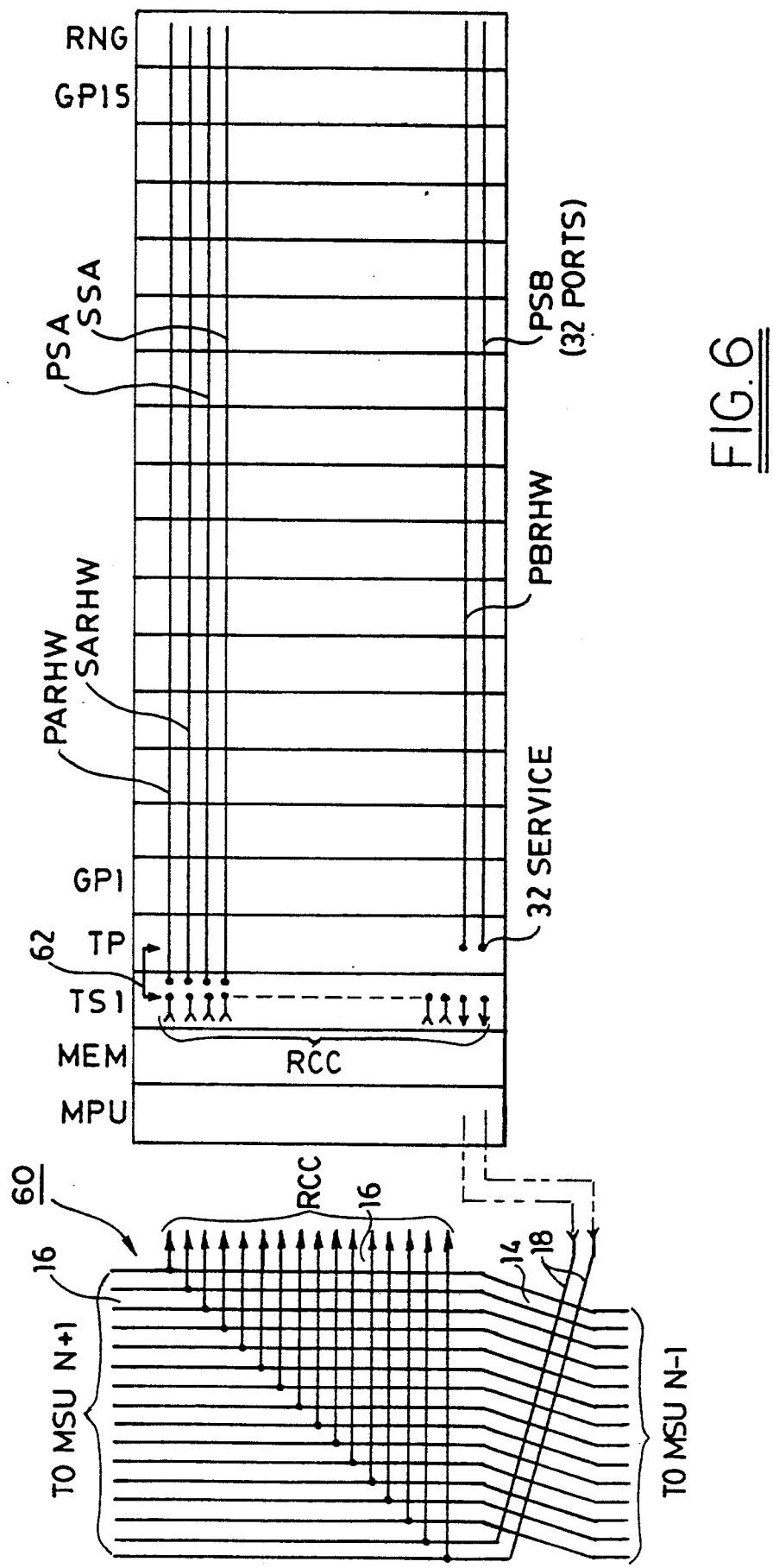

FIGS. 3(A)-(C) are a block diagram schematically illustrating the time slot interchange of a TDM digital communication system shown in FIG. 1 which is implemented in accordance with another embodiment of the invention;

FIG. 4 is a block diagram of one of the multiplexing circuits (PCM-MUX) shown in FIG. 1;

FIG. 5 is a block diagram of one of the demultiplexing circuits (PCM-DEMUX) shown in FIG. 1; and FIG. 6 is a simplified diagram of a shelf providing one of the modular switching units shown in FIG. 1 illustrating the backplane circuit board thereof and the manner in which the receive and send highways on a shelf may be interconnected to the time slot interchange and also to a cable which is connected to the other modular switching units which are disposed on shelves above and below the shelf which is illustrated in the figure.

Referring to FIG. 1, there is shown a TDM digital telephony system of the type described in U.S. Pat. No. 4,228,536 which is provided with expanded switching capability in accordance with the present invention. The system has eight modular switching units, one of which, MSU0 is shown in detail. The other units, MSU-1-MSU7 are identical. Each unit contains a group of port circuits (ports-A) and a group of service circuits (service-A) each having 32 circuits. These circuits are similar to those described in the above referenced U.S. Pat. No. 4,228,536. They receive timing and transmit control signals on T and C lines to a controller containing a microprocessor and a timing unit. The timing signals are also sent to the other MSUs. These MSUs also are sent messages (IPMs) for setting up connections and receive messages over the IPM line from the other MSUs. Another signal indicated as MSU-IDENT, identifies the MSU shelf by offset in the interconnecting cables which carry the send highways (PSHW0 to PSHW7 and SSHW0 to SSHW7). The offset in the lines on the cables provides a code which identifies the MSU as is described in U.S. Pat. No. 4,228,536.

The ports are connected to lines and trunks and multiplex transmission systems (L,T and M). A multiplex system is exemplified as a T1 system. The service circuits include tone generators and receivers and circuits providing call accounting and other features. The system is expanded by adding 64 additional circuits to take advantage of the doubled switching capacity of the system. These additional circuits are arranged in groups of 32 each and are shown as ports-B and service-B circuits. Each group of circuits sends multibit digital signals successively in 8 bit words in different ones of 32 time slots which constitutes a frame of time slots. The rate at which these bits are transmitted is, in this example, 2.048 MHz. All frames are synchronous since timing is derived from a common clock in the MPU (microprocessor - control). All of these time slots are transmitted at a higher rate upon multiplexing thereof in PCM multiplexers (PCM-MUX), exemplified in FIG. 4. The PCM-MUX circuits transmit the bits alternately from the ports-A and ports-B circuits on the PSHW0 highway. Similarly, the service-A and service-B circuits transmit their bits alternately upon multiplexing thereof on the SSHW0 highway. These highways are also connected internally in the MSU (MSU0). Accordingly, MSU0 and all of the other MSUs receive all of the PCM data generated in MSU0 and MSU0 receives all of the PCM data generated in all of the other MSUs.

Figure 2:
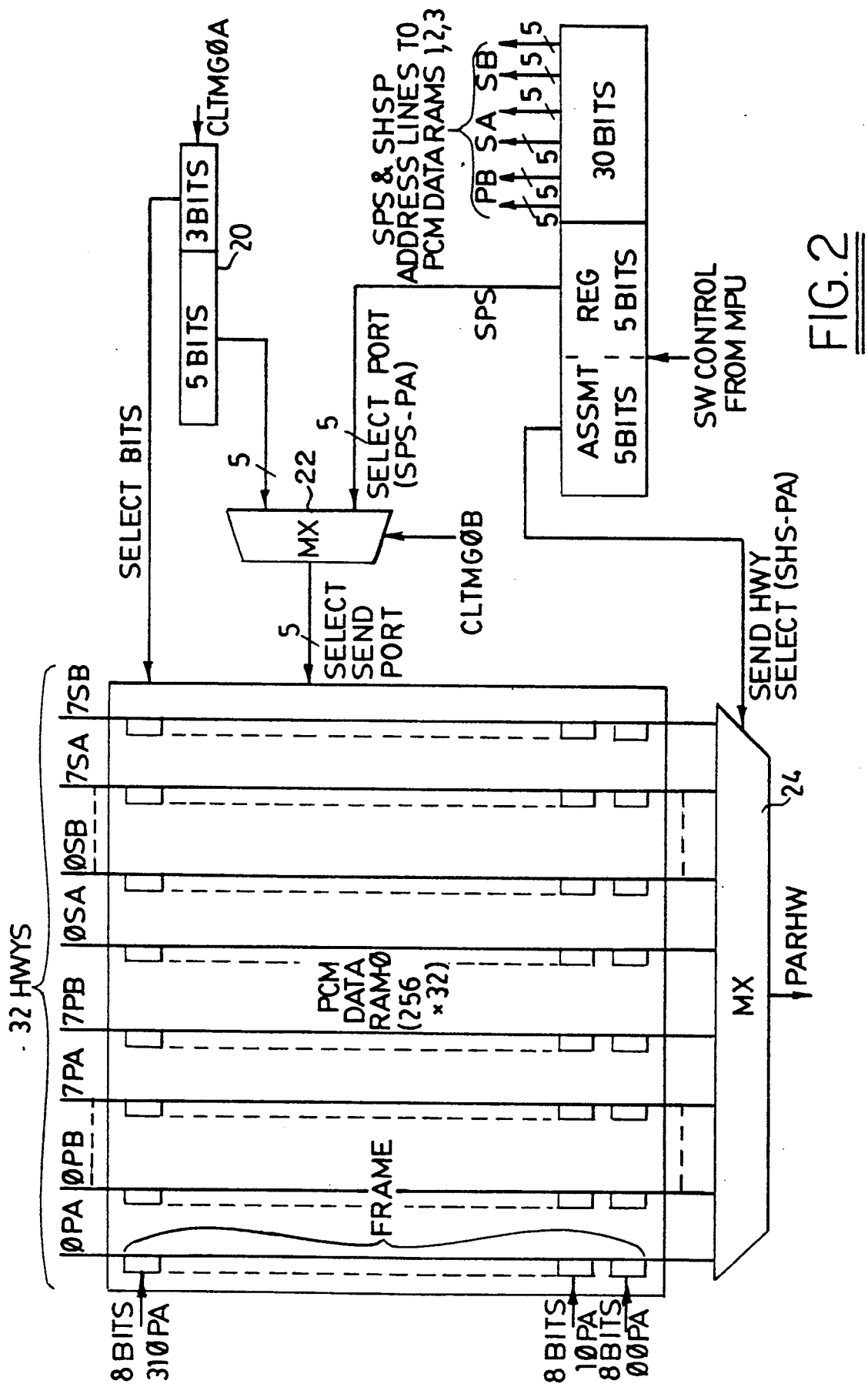
FIG. 2 is a block diagram schematically illustrating a portion of the time slot interchange which services one of the receive highways for one of the groups of circuits in the system shown in FIG. 1 when configured in accordance with one embodiment of the invention.

The data carried on each of the send highways is, therefore, successive words, each containing 8 successive bits in frames of 32 words. The data on each highway is demultiplexed in PCM-DEMUX circuits. Examples of these circuits are shown in FIG. 5. There are 32 streams of demultiplexed data which originate in the port and service circuit of each MSU. These streams of data and the lines on which they are carried are indicated as 0PA, 0PB for the data from the ports-A and ports-B circuits of MSU0 and 0SA and 0SB for the PCM data from the service-A and service-B circuits. The data from the other MSUs (MSU1 to MSU7) and the lines carrying these data are indicated by similar nomenclature (i.e., 1PA, 1PB to 7PA, 7PB and 1SA, 1SB to 7SA, 7SB). These lines of data are connected to a nonblocking time slot interchange (TSI). This interchange may be implemented in accordance with two embodiments of the invention. The first embodiment is shown in FIG. 2 and utilizes four random access memories (RAMS) into which bits are read in and read out sequentially to provide a 1024 by ($\times$) 128 switching matrix. This TSI also includes additional address circuitry, all of which will be described in connection with FIG. 2.

In accordance with the embodiment of the invention shown in FIGS. 3(A)-(C) the TSI may contain four groups of eight RAMS each having 128 by 8 locations where the PCM data is organized and stored on a word by word basis. The four groups of eight RAMS also provide a 1024 by 128 switching matrix. The words are read in and read out in locations in selected time slots so as to provide the interconnections between any of the circuits in any of the eight MSUs. The RAMS which are used may be conventional eight bit wide RAMS of sufficient length to store 128 words (128$\times$8). Four groups of 32 corresponding to the time slots in the four frames of time slots arrive simultaneously from the four groups of circuits (ports-A, service-A, ports-B, service-B) of the MSU. This embodiment of the TSI also utilizes serial to parallel format converters so that the time slot words may be read into and stored in the RAMs on a word by word rather than a bit by bit basis as is the case for the RAMs in the TSI shown in FIG. 2. Since RAMS which operate on a word by word basis are available at lower cost than RAMs which operate on a bit by bit basis and require a slower access time than such bit by bit accessed RAMs, the TSI shown in FIGS. 3(A)-(C) are presently preferred in that it may be implemented at lower cost than the TSI shown in FIG. 2.

The TSI is addressed by switching control from the MPU—control as was explained in the U.S. Pat. No. 4,228,536. The output from the TSI is four receive highways, namely PARHW, SARHW, PBRHW and SBRHW which are connected to and deliver the PCM data in the selected time slot to create the selected interconnections with the respective ports-A, service-A, ports-B and service-B circuits.

Since the input data is demultiplexed, it is processed in the TSI at the same rate that it is delivered from the ports, namely 2.048 MHz. The format of the data in 32 time slots per frame is the same as used in the existing switching system (i.e. the system of U.S. Pat. No. 4,228,536). Thus, the ports and service circuits may be like those used in the exiting system. The TSI is of a design different from the TSI used in the existing system in that it is expanded to store data in different groups of locations each corresponding to a different group of circuits of each MSU. Program control is similar and expanded to include capacity for addressing the TSI to provide the additional connections via the TSI. Thus, the expanded system is compatible with the existing system and all of the port and service circuits and the MPU control circuits may be identical; the MPU providing only a higher frequency clock in order to multiplex the PCM data on the send highways.

Referring to FIG. 2, there is shown in a simplified, schematic manner, the bit sequential TSI. Only one of four PCM data RAMS (RAM-0) is illustrated. This RAM receives all 32 highways 0PA, 0PB to 7PA, 7PB and 0SB, 0SB to 7SA, 7SB and provides the ports-A receive highway (PARHW). There are three other identical RAMs which output the PBRHW and the SARHW and SBRHW. These RAMs are addressed by different groups of 10 bits on PB, SA and SB lines from an assignment register. The addressing of all of the RAMs in order to read in the PCM time slot data is provided by an eight bit counter 20, five bits of which select the sending port time slot through a selector switch (MX) 22. The other three bits address the RAM so as to select each of the eight bits in each time slot.

The RAM is organized in bit sequential manner to store 32 successive time slots, each for an eight bit word, which constitute a frame. For example, the first word from the ports-A highway (00PA) is stored in the lowest bit position in that it is read in first. The next word on that highway (10 PA) is stored next. The last word which is stored is from the 32nd time slot (310PA). All of these words are stored in a first of 32 groups of locations. The time slot which is selected is identified by switching control from the MPU of the MSU (SW-control from MPU).

The control word is read into the assignment register and consists of two groups of five bits each. The sending port or service circuit time slot is selected by the group of bits indicated as SPS. This group is switched by the selector (MX) 22 on phase A of the 2.048 MHz clock one half clock period later than phase B of the clock which clocks the counter 20 and causes the bits to be read into the RAM. Thus, reading in and reading out occurs on successive halves of the clock cycle, and at the end of a frame, the selected time slot will be read out. The assignment register reads out one of the groups of locations by applying five bits of the control word to another selector switch (MX) 24. The bits from the selected highway, a time slot of which is selected by the other five bits in the assignment register on the SPS line, is read out sequentially on the PARHW receive highway via the switch 24. For further information respecting the organization and addressing of a bit sequential RAM such as shown in FIG. 1 to provide time slot interchange, reference may be had to the U.S. Pat. No. 4,228,536, especially FIG. 3 thereof.

Referring to FIGS. 3(A)-(C) there is shown the embodiment of the TSI which is organized and reads in and reads out the eight bit words in each time slot of each frame on a word by word basis. Only the portion of the TSI which is in MSU0 is shown in detail. This is the TSI portion which outputs the data on the PARHW read highway and is, therefore, referred to as the PARHW-TSI. It utilizes eight RAMs. The TSI of MSU0 also has three additional sets of eight RAMs each thereby providing storage for 1024 time slots and enabling connections between any circuit in any group of circuits, port or service in all of the eight MSUs. These additional TSIs are indicated as the PBRHW, the SARHW and the SBRHW TSIs. All are identical and use the same counter 30 and the same assignment register 32 (but different 10 bit addresses therefrom, indicated at PBRHW, SARHW and PBRHW-TSI).

The data from MSU0 (MSU0D in each of the 32 time slots from each of the four groups of circuits, ports-A, ports-B, service-A, service-B) is delivered successively in eight bit words to the first of the eight RAMs. Similarly, the data from the other MSUs is delivered on a word by word basis for each of the time slots for each of the groups of circuits to each of the other seven RAMs (RAMs 1-7).

The word wide data is obtained in a PCM serial to parallel format converter. One such converter is contained in each MSU. The converter is made up of four eight bit shift registers which are clocked by the phase A clock which governs the addressing of the RAMs in that it also clocks the eight bit counter 30. The converter also includes eight four bit shift registers. The four bit registers are effectively in orthogonal relationship to the eight bit shift registers. Each stage of a different one of the eight bit registers is connected to present its data to a different stage of a different one of the four bit registers. The eight bit registers receive the serial data (the serial bits of the eight bit words after demultiplexing).

The first of the eight bit shift registers, therefore, receives the sequential bits from the ports-A send highway as indicated by the line 0PA at the input to the first eight bit shift register. The first stage (0) of the first eight bit shift register is connected to the first stage of the first four bit shift register (the 0SR—four bits shift register). This first stage input is labelled 0PA0. The next stage (the second or one output line from the first shift register) is connected to the input of the first stage (1PA0 of the second four bit shift register, 1SR—four bits). The successive stages of the first shift register are connected to the first stage of the successive four bit shift registers. Similar connections are made to all four bit shift registers from the eight bit shift register which receives the bit stream from the PB highway of MSU0; the stages, thereof, being connected to the second stage 0PB0, 1PB0, 2PB0, 3PB0, 4PB0, 5PB0, 6PB0 and 7PB0 of the 0SR, 1SR, 2SR, 3SR, 4SR, 5SR, 6SR and 7SR four bit shift registers, respectively. The eight bit shift register stages which receive the bit stream from the SA highway of MSU0 are similarly connected to the third stage of the four bit shift registers, and the eight bit shift register which receives the SB send highway from MSU0 has its eight outputs connected to the eight outputs of the eight four bit shift registers.

The four bit shift registers are clocked by the phase-A clock divided by two in rate, since the clock for the four bit shift registers is obtained from the first stage (the 0TH stage) of the eight bit counter 30. Thus, every eight bits of the phase-A clock, a successive word from each of the four highways is presented at the MSU-0 data output (MSU0D). During each frame, the words from each send highway in the MSU (the PA, PB, SA, SB highways) are presented to the input of the RAM.

The RAMs are addressed by the first and second bits of the eight bit counter 30 on address line HWSELAD. These two address lines determine which of the four word positions for the bits of the same time slot are addressed. The next five counter 30 bits on lines TSSELAD select one of the 32 time slots where the four words, PA, PB, SA and PB are stored. After a frame has been inputted, the words are disposed in successive locations for successive time slots as shown in RAM0. Similarly, using PCM serial to parallel format converters (PCM SPC −1 to −7) for data from the send highways from the other MSUs, the PCM data on all of the other highways are addressed and read into RAMs 1-7. Each RAM provides a different location for the PCM data from each MSU and each RAM stores a frame of data from each MSU.

As the data is being read in, the data is read out on alternate half cycles of the clock. The read out of the data in the appropriate time slot to make the desired connection is timed by the phase-B clock. The assignment register has four groups of ten bits each on ten address lines which respectively address each of the four sets of eight RAMs. The data is read out in parallel on the read highway for each set of RAMs. This data may be read into an eight bit shift register in parallel and read out successively in the time slots which are interconnected as a series or stream of bits of the eight bit words. The parallel to serial converter shift register is not shown in FIGS. 3(A)-(C). The addresses utilize five of the address bits to select one of the 32 time slots. Two of the address bits are used to select the highway bit, PA, PB, SA or SB in the selected time slot. Three bits are used as the MSU select address (MSUSELAD) which selects the one of the eight RAMs in the set (i.e., the MSU sending the data). The 40 address bits, thus, change on each time slot of the 128 time slots and successively read out a frame of data to the receive highway which is selected in the time slot of the circuit on that highway to which a connection is to be made. In this manner, 1,024 different connections can be made during each frame. The TSI, thus, operates in a non-blocking mode.

Referring to FIG. 4, each PCM-MUX which increases the speed or rate at which data is transmitted on the send highways is implemented with two AND gates, an OR gate and an inverter. The 4.096 MHz clock gates the AND gates on alternate halves of each period thereof. The A and B inputs to the AND gates, say from the port-A and the port-B circuits, arrives at a 2.048 MHz rate in synchronism with each half period of the 4.096 MHz clock. Thus, the AND gates are alternately enabled and the outputs from the A and B inputs are transmitted in alternate succession at the 4.096 MHz rate, as 4.096 MHz PCM data onto the send highway.

Demultiplexing may be implemented by the PCM DEMUX circuit shown in FIG. 5. This circuit uses an inverter and two D flip flops. The PCM data at 4.096 MHz is presented to the D inputs of both flip flops while the flip flops are alternately clocked at a 2.048 MHz rate. Thus, the alternate successive bits appear at the Q outputs of the flip flops simultaneously at the 2.048 MHz rate.

Referring to FIG. 6, there is shown a shelf in which one of the MSUs is physically located. This shelf may be one shelf on a standard 19 inch wide telephone relay rack. The other 7 MSUs are on different shelves of the rack. Another of the eight MSUs (MSU N+1) is disposed above the MSU shown in FIG. 6, and another MSU (the MSU N−1) MSU is disposed in the shelf below. The MSUs are connected by a ribbon cable 60 having a connector RCC with pins which are connected to a ribbon cable connector, also labelled RCC, on the TSI board on the shelf. The lines of the ribbon cable which carry the send highways are shown. The ribbon cable also carries highways for the inter-MSU messages for switching control (the IPMs) and lines which carry timing signals. These timing and control lines are not shown. The ribbon cable is shown with an offset to provide connections to different pairs of ribbon cable lines without special wiring. A similar technique is used in U.S. Pat. No. 4,228,536 to obtain unique MSU identification codes.

The ribbon cable connector is disposed on a back plane circuit board which extends across the shelf. The shelf includes slots which receive different printed circuit boards or cards. These cards extend orthogonally to the back plane circuit board (in a direction perpendicular to the sheet on which the drawing appears). These slots receive the MPU controller (MPU) and memory board (MEM). There are two slots labelled TSI and TP on which the TSI and a group of 32 circuits, for example, the group providing the service-A circuits are located. These boards are connected by a physical interconnector indicated at 62. While in a physically separate slot, these 32 circuits are logically on the TSI board. The TSI board has a connector which provides a multiplicity of connections to the back plane board. These connections include the two outgoing highways for the two sets of port circuits (ports-A and B) and two sets of service circuits (service-A and service-B) on the shelf.

The shelf includes 15 general purpose slots (GP1 to GP15) and an end slot in which ringing generators and the power supply for the shelf is located. This back plane board contains lines which extend from the location of the TSI slot across the general purpose slots up to the end slot. Two of these lines are used for the send highway for the ports-A and service-A circuits and are labelled PSA and SSA. Two of these lines carry the receive highways for the ports-A and service-A circuits and are labelled PARHW and SARHW. Since the service-A circuits are logically resident on the TSI board, additional lines which extend across all of the general purpose slots and to the last slot are not required. Two lines for the ports-B send highway (PSB) and the ports-B receive highway (PBRHW) do extend but from the slot labelled TP adjacent to the TSI slot to the last slot. Accordingly, all of the ports in the ports-A, service-A and ports-B groups of circuits may be located in any of the 15 general purpose slots. The physical arrangement or form factor of the shelves is the same as in the existing switching system. 64 more circuits have been added to the shelf without any change in form factor.

From the foregoing description, it will be apparent that improved, expanded TDM digital communication systems have been provided by the present invention. Variations and modifications in the herein described systems, within the scope of the invention, will undoubtedly suggest themselves to those skilled in the art. For example, the PCM data signals from the port and service circuits may be multiplexed at a higher rate and fewer send highways are needed. Thus, by multiplexing at 8.192 MHz all four port and service circuits of an MSU may use one send highway. At the PCM demultiplexers, the data is then demultiplexed to four streams of 2.048 MHz data. Accordingly, the foregoing description should be taken as illustrative and not in a limiting sense.

We claim:

1. In a TDM digital communication system using a switching system having a switching unit with a send highway carrying cyclically repetitive frames of a certain number of successive multi-bit digital signals in successive time slots, a time slot interchange for switching digital signals in selected ones of said time slots to a receive highway to provide interconnections between different ones of a plurality of circuits equal in number to the number of said time slots in each of said frames which generates said digital signals and which receives said digital signals, the improvement for expanding the number of said circuits connectible by means of said unit without increasing the number of time slots in each of said frames which comprises means for multiplexing digital signals from said circuits into a plurality of successions equal in number to the number of bits of said multi-bit digital signal in each of said time slots to provide said plurality of successions of said digital signals each with a plurality of digital signals from a different group of said circuits, said time slot interchange comprising a memory with separate groups of locations for each multi-bit signal in a frame from each group of said circuits, and means for transmitting said successions along said send highway at a second rate which is a multiple of a first rate which equals the number of bits in each succession, and demultiplexing means for applying said digital signals from said successions separately to different ones of said groups of locations at said first rate.

2. In a TDM digital communication system having a plurality of modular switching units interconnected by a plurality of said highways which carry cyclically repetitive frames containing a certain number of successive bits of multi-bit digital signals in successive time slots from each of said modular switching units to all of the other of said plurality of modular switching units, and wherein one of said plurality of send highways returns said digital signals thereto for switching therein, said modular switching units each also having a time slot interchange which switches said digital signal in time slots carried on one of said plurality of said send highways to time slots on a plurality of receive highways to selectively provide a multiplicity of connections between circuits in said units, which circuits generate and receive said digital signals to provide a multiplicity of interconnections there between, the improvement for expanding the number of said circuits in each of said units between which said interconnections can be provided without increasing the number of time slots in each of said frames which comprises multiplexing means for formatting said digital signals for each time slot into successions, each having a plurality of said digital signals and each of which successions being generated by a different group of said circuits in each of said units and for transmitting said digital signals formatted in said successions over said send highways at a second rate which is a multiple of a first rate, said multiple being equal to the number of said plurality of digital signals in each of said successions, said time slot interchange comprising a digital signal memory having separate locations for each time slot, each of which locations contains different multi-bit digital signals from different ones of said successions, different groups of said locations corresponding to different one of said groups of circuits, means from demultiplexing said digital signals on said send highways and for applying them to said memory in said different groups of locations at said first rate, and means for selectively reading out said different groups of locations into different ones of said groups of circuits via different ones of said receive highways at said first rate to provide said connections.

3. A TDM digital communications system for switching digital signals between N circuits where they occur at a certain rate which are assigned to different ones of N sequential time slots in repetitive frames of said N time slots which system is expanded for switching of digital signals between n groups of said N circuits in frames containing the same number N of time slots all of which are in synchronous relationship, said system comprising means for multiplexing said signals from said circuits onto a send highway so that said signals from said each of said n groups of N circuits occur on said send highway sequentially and at a rate which is n times faster than they occur from any one of said n times N circuits, a time slot interchange having memory means with separate n groups of N locations for digital signals in each time slot of a frame from each of said n groups of circuits, and means for addressing said memory for reading in said digital signals in the location for their respective group and reading out said digital signals to different ones of a plurality of receive highways connected to different groups of N of said n times N circuits for establishing connections between selected ones of said circuits, and multiplexing means for applying said digital signals from each of said groups of n circuits to said time slot interchange with said time slots in each frame from each circuit in synchronous relationship at a rate which is 1/n times as fast as the rate said signals occur on said send highway.

4. The system according to claim 3 wherein said system has m switching units each with n groups of said circuits between which m times n times N circuit connections are selectively made, each of said m units having the send highway thereof connected to the others of said m units to carry said signals therefrom at said n times faster rate to said m units, each of said m units has a time slot interchange with memory means having m times n groups of locations which are addressable to receive digital signals from each of the m times n times N circuits of each of said m units and to read out said digital signals to m times n receive highways in selected time slots to provide any of n times m times N connections between said circuits, a plurality of said demultiplexing means each being separately provided for applying said digital signals at said 1/n times as fast rate from each of said send highways to each said time slot interchange.

5. The system according to claim 3 wherein said digital signals are formatted in multi-bit words, each word allocated to a separate time slot, and said memory locations are in groups having storage for successive ones of the words of different groups of N words each from a different one of said n groups of said N circuits, and said addressing means includes means for addressing said memory for read-in and read-out said words on a bit by bit basis.

6. The system according to claim 3 wherein said digital signals are formatted in multi-bit words, each word allocated to a separate time slot, and said memory locations are in groups having storage for the words of each time slot from each of said n groups of N circuits, means for converting the format of said words from said send highway from bit to word sequential to present said multi-bit words sequentially for storage in said memory, and said addressing means includes means for read-in and read-out of said words on a word by word basis.

7. The system according to claim 4 wherein said digital signals are formatted in multi-bit words, each word allocated to a separate time slot and said memory locations are in groups having storage for successive ones of the words of n groups of N words each from a different one of said n groups of said N circuits, and said addressing means includes means for addressing said memory for read-in and read-out said words on a bit by bit basis.

8. The system according to claim 4 wherein said digital signals are formatted in multi-bit words, each word allocated to a separate time slot, and said memory locations are in groups having storage for the words of each time slot from each of said m times n groups of N circuits, means for converting the format of said words from said send highways from bit to word sequential to present said multi-bit words sequentially for storage in said memory, and said addressing means includes means for read-in and read-out of said words on a word by word basis.

9. The system according to claim 3 wherein half of said n circuits are port circuits and the other half of said n circuits are service circuits, each of said port and service circuits being a group of N circuits.

10. The system according to claim 4 wherein half of said m times n circuits are port circuits and the other half of said m times n circuits are service circuits, each of said port and service circuits having a group of up to N circuits.

11. The system according to claim 9 further comprising a shelf having a plurality of side by side slots providing a receptacle for a different one of a plurality of first circuit boards, a second circuit board extending across said shelf and providing connections to at least several of said plurality of said first circuit boards which provide said port and service circuits, said time slot interchange being on one of said plurality of first circuit boards and in another of said first circuit boards in one of said slots adjacent to the slot receiving said time slot interchange circuit board and said second circuit board, having conductive paths carrying said highways which extend across all of said slots to ones thereof for receiving said time slot interchange.

12. The system according to claim 10 further comprising a plurality of shelves each for a different one of said m units having a plurality of side by side slots providing a receptacle for a different one of a plurality of first circuit boards, a second circuit board extending across said shelf and providing connections to at least several of said plurality of said first circuit boards which provide said port and service circuits of said different ones of said m units, said time slot interchange being on one of said plurality of first circuit boards and in another of said first circuit boards in one of said slots adjacent to the slot receiving said time slot interchange circuit board, said second circuit board having conductive paths carrying said highways which extend across all of said slots to ones thereof for receiving said time slot interchange, and a cable having a plurality of lines each for the send highways from each of said m units connected to said second circuit board, said second circuit board providing connection from said lines of said cable to said time slot interchanges.

* * * * *